Figure 1:
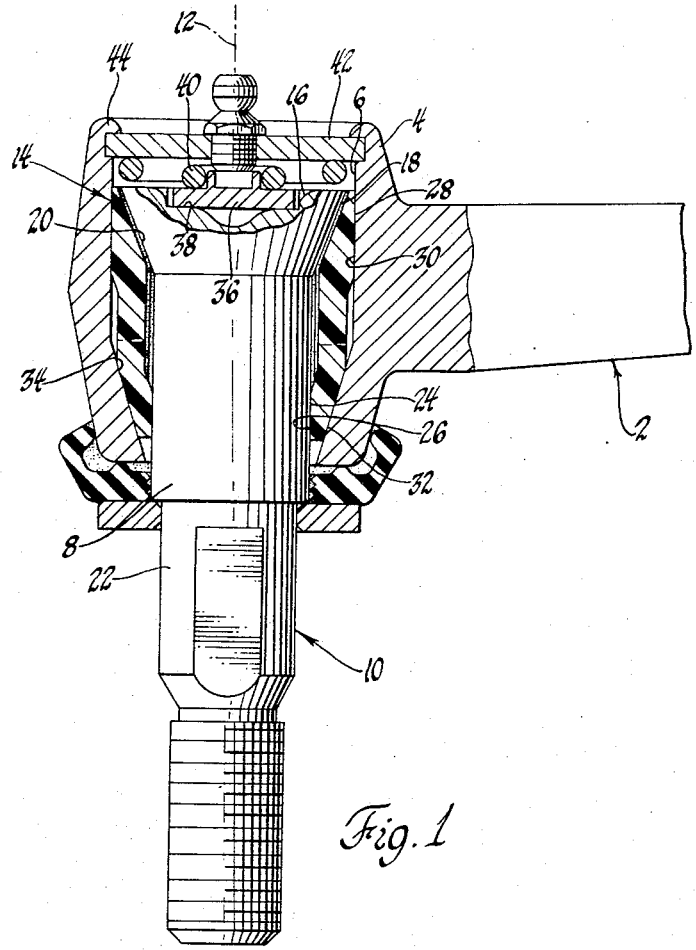

Jan. 2, 1968   D. P. MARQUIS ET AL   3,361,459

IDLER ARM BEARING ASSEMBLY

Filed May 16, 1966

INVENTORS
Donald P. Marquis,
Larry L. Ruffle, &
Melvin A. Schultz
W. F. Wagner
ATTORNEY

United States Patent Office 3,361,459
Patented Jan. 2, 1968

3,361,459
IDLER ARM BEARING ASSEMBLY
Donald P. Marquis and Larry L. Ruffle, Saginaw, and Melvin A. Schultz, Bay City, Mich., assignors to General Motors Corporation, Detroit, Mich., a corporation of Delaware
Filed May 16, 1966, Ser. No. 550,231
4 Claims. (Cl. 287—93)

This invention relates to bearing assemblies and more particularly to an improved bearing assembly for a vehicle steering linkage idler arm.

In conventional application, the idler arm of a steering linkage is ideally pivotally mounted on the vehicle superstructure in such a way as to provide free rotation about a fixed axis. For optimum geometric accuracy, the bearing which establishes the axis of rotation should completely resist any tendency of the idler arm to deflect in any plane other than one normal to the axis of the fixed pivot. However, since pin joints of such character exhibit the normal tendency to wear in use, a degree of slackness gradually arises which tends to reduce accuracy of steering geometry.

In the past, various proposals have been advanced aimed at providing an idler bearing in which slackness resulting from wear is automatically taken up. Typical of such arrangements are U.S. 2,937,033 Herbenar and U.S. 3,044,798 Gerner, both of which utilize in one form or another the concept of a conically formed stud arranged in bearing engagement with a similarly conically formed bushing or housing. In both cases, wear take-up is accomplished by axial preloading means effective to maintain bearing engagement. However, while the former provides a simple construction embodying a single frusto-conical bushing mating with a continuous frusto-conical stud bearing surface, disadvantage may result due to the fact that non-uniform wear with respect to the axial opposite ends of the bushing will nonetheless permit unwanted rocking action. In addition, since the taper angle utilized must be in excess of that which would induce locking relationship, the effective axial length of the bearing must either be limited, or the overall size of the bearing substantially increased. In the latter case, while these problems are somewhat alleviated by axially spacing separate pairs of mating conical surfaces, the solution is accomplished only at the expense of a considerably more complex construction.

According to the general features of the present invention, an improved idler arm bearing assembly is provided which utilizes the self-adjusting wear take-up capabilities of substantially axially spaced mating conical surfaces while retaining the advantages of a minimum number of parts. In particular, the invention utilizes a unitary bushing having two frusto-conical surfaces formed in substantially axially spaced relation, one of which mates with the stud and the other with the bearing housing. The geometric accuracy of a bearing in accordance with the present invention is further enhanced by virtue of the fact that the self-aligning wear take-up feature attributable to interaction of the frusto-conical surface mating with the housing indirectly acts to provide the corresponding gradual wear take-up with respect to radially adjacent mating cylindrical surfaces formed on the stud and bushing.

Figure 2:
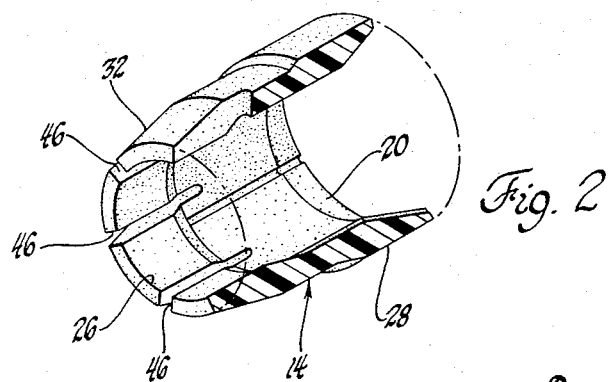

The foregoing and other objects, features and advantages of the invention will become more fully apparent as reference is had to the accompanying specification and drawing wherein:

FIGURE 1 is a side elevational view, partly in section with parts broken away, of an idler arm assembly incorporating the invention; and FIGURE 2 is a fragmentary perspective view of the bushing element utilized in the construction of FIGURE 1.

Referring now to the drawing and particularly FIGURE 1, the reference numeral 2 generally designates an idler arm, the free end of which, not shown, is adapted for connection in a conventional manner to a vehicle steering linkage, also not shown. Idler arm 2 includes an integral socket portion 4 forming a vertically extending opening 6 in which is rotatably disposed the stud portion 8 of a support bracket 10. Support bracket 10 in turn is intended for mounting in a fixed position on a vehicle chassis, not shown, to establish an axis of rotation 12 for idler arm 2.

In order to assure free precision swinging movement of arm 2 exclusively in a plane normal to the axis 12, a bushing element 14 of suitable anti-friction material, such as Delrin, is interposed between stud 8 and opening 6. According to the invention, the inner wall of opening 6, the respective outer and inner walls of bushing 14, and the outer wall of stud 8 are formed for mating engagement such that initial accurate fit is obtained and uniformly maintained by automatic wear take-up during the service life of the idler arm. To this end, the enlarged upper end 16 of stud 8 is formed with a tapered outer surface of revolution 18 arranged in mating engagement with a tapered inner surface of revolution 20 formed at the upper end of the inner wall of bushing 14. The lower portion 22 of stud 8 in turn forms an extended cylindrical outer surface of revolution 24 arranged in mating engagement with a cylindrical inner surface of revolution 26 formed at the lower end of the inner wall of bushing 14. The upper end of the outer wall surface of bushing 14 in turn is formed with an outer cylindrical surface of revolution 28 which is received in mating engagement with an inner cylindrical surface of revolution 30 formed at the upper end of opening 6. The lower end of the outer wall of bushing 14 radially adjacent the cylindrical inner surface of revolution 26 is formed with a tapered outer surface of revolution 32 arranged in mating engagement with a tapered inner surface of revolution 34 formed at the lower end of the opening 6.

With the stud, bushing and socket arrangement in the manner described, a thrust bearing plate 36 is disposed in abutting engagement with a recess 38 formed in the end of stud 8. Bearing 36 in turn is engaged by a compression spring 40 which reacts against a plate closure 42 secured in the upper end of socket 4 by spinning over the terminal inner edge 44 thereof. In operation, spring 40 exerts axial thrust on stud 8 causing precision bearing engagement between the upper mating frusto-conical surfaces 18 and 20 of stud portion 16 and bushing 14, respectively, which in turn exerts a downward force on bushing 14 causing a precision mating engagement between the lower frusto-conical surfaces 32 and 34 of the bushing 14 and socket 4, respectively. It should be noted that wear incident to operation of the bearing will occur primarily between the mating conical surfaces at the upper end of stud 8 and the substantially axially displaced mating cylindrical surfaces at the lower end thereof. Consequently, although wear take-up with respect to the upper end of the stud is automatically achieved by axial downward displacement of the stud relative to the bushing, corresponding wear take-up between the cylindrical surfaces 24 and 26 does not result from such axial displacement.

To accomplish wear take-up between the mating cylindrical surfaces 24 and 26 in accordance with the invention, the lower portion of the bushing is formed with a plurality of circumferentially spaced radially extending slots 46 which permit the inner surface of revolution 24 of the bushing to progressively diminish in effective diameter as the tapered outer surface of revolution 32 of the bushing is forced radially inwardly by the tapered inner surface of revolution 34 of socket 4 responsive to progressive axial downward displacement of the bushing induced by axial pressure of spring 40.

When formed and arranged in the manner described, a bearing construction is achieved which provides substantially axially separated bearing engagement along the length of stud 8 to provide optimum resistance to rocking movement of the idler arm 2 while retaining the automatic wear take-up capabilities incident to conical mating surfaces. Additionally, a substantial proportion of the relatively rotating surfaces of stud 8 and bushing 14 are cylindrical in form rather than conical and therefore tend to achieve optimum freedom from relative rocking movement as compared to a construction in which the relatively rotating surfaces are entirely conical. In addition, a construction according to the invention permits optimum utilization of the conical wear take-up feature along an extended axial length without appreciably diminishing the diameter of the stud at the end nearest the projected apex of the cone. It will, of course, be apparent that a single continuously tapering bushing extending from one end of the socket to the other would require either a significantly larger socket or housing or would seriously limit the diameter and hence strength of the stud at the diminished conical extremity.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. An idler arm assembly comprising an idler arm having a socket formed therein, a support bracket including a stud portion rotatable within said socket, an annular bushing interposed between said socket and said stud, said stud and said bushing each having at one end complementary tapered portions located near one end of said socket, said bushing and said socket having complementary tapered portions at their other ends axially spaced from said first mentioned tapered portions by a stepped intermediate portion on said bushing, closure means in one end of said socket, and spring means engaging between said closure and said stud to maintain said socket in self-adjusting alignment with the major axis of said stud.

2. The invention of claim 1 wherein the portion of the bushing outer periphery radially adjacent said first mentioned complementary tapered portion forms a cylindrical wall mating with a complementary cylindrical wall in said socket and the portion of the bushing inner periphery radially adjacent said second mentioned complementary tapered portions forms a cylindrical wall mating with a complementary cylindrical wall on said stud.

3. The structure set forth in claim 2 wherein said bushing is formed with circumferentially spaced vertical slots extending radially through the portion of said bushing radially adjacent said second mentioned complementary tapered portions.

4. An idler arm assembly comprising an idler arm having an opening extending therethrough forming a cylindrical upper portion merging with a frusto-conical lower portion, a support bracket including a stud portion rotatably within said opening, said stud having a frusto-conical upper portion merging with a cylindrical lower portion, an annular bushing disposed between said opening and said stud, the outer surface of revolution of said bushing forming a cylindrical wall mating with the cylindrical upper portion of said socket and a tapered wall mating with the frusto-conical lower portion of said socket and having a stepped portion therebetween, the inner surface of revolution of said bushing forming a cylindrical wall mating with the cylindrical lower portion of said stud and a tapered wall mating with the frusto-conical upper portion of said stud and having a stepped portion therebetween, spring means disposed axially adjacent the upper end of said stud and bearing on said stud at one end, and closure means secured in said socket adjacent the other end of said spring causing the latter to exert axial pressure on said stud and bushing to maintain said stud and arm in self-adjusting precision rotary relationship.

References Cited

UNITED STATES PATENTS

| 2,621,950 | 12/1952 | Ricks | 287—96 |
| 2,937,033 | 5/1960 | Herbenar | 287—90 XR |
| 3,044,798 | 7/1962 | Gerner | 287—93 XR |
| 3,307,888 | 3/1967 | Dumpis | 287—93 XR |

CARL W. TOMLIN, *Primary Examiner.*

ANDREW KUNDRAT, *Assistant Examiner.*